(12) United States Patent
Marks et al.

(10) Patent No.: US 7,596,752 B2
(45) Date of Patent: Sep. 29, 2009

(54) DELAYING OPTIMAL PARAGRAPH LAYOUT DURING EDITING

(75) Inventors: Alan Marks, Seattle, WA (US); Anton Sukhanov, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 775 days.

(21) Appl. No.: 11/205,361

(22) Filed: Aug. 15, 2005

(65) Prior Publication Data
US 2007/0038928 A1 Feb. 15, 2007

(51) Int. Cl.
*G06F 17/00* (2006.01)
(52) U.S. Cl. ..................................... 715/255
(58) Field of Classification Search ................. 715/251, 715/255, 256, 243
See application file for complete search history.

(56) References Cited

U.S. PATENT DOCUMENTS

| | | | | |
|---|---|---|---|---|
| 4,574,363 | A | 3/1986 | Carlgren et al. | 715/258 |
| 5,438,512 | A * | 8/1995 | Mantha et al. | 715/234 |
| 6,223,191 | B1 * | 4/2001 | Truelson | 715/205 |
| 6,321,243 | B1 * | 11/2001 | Ballard | 715/202 |
| 6,647,533 | B1 | 11/2003 | Lin et al. | 715/517 |
| 6,948,119 | B1 | 9/2005 | Farmer et al. | 715/206 |
| 7,020,838 | B2 * | 3/2006 | Tsykora | 715/241 |
| 7,191,390 | B2 * | 3/2007 | Williamson et al. | 715/251 |
| 2002/0069219 | A1 * | 6/2002 | Weng | 707/501.1 |
| 2002/0124023 | A1 * | 9/2002 | Wormley | 707/517 |
| 2003/0167448 | A1 | 9/2003 | Williamson et al. | 715/251 |
| 2003/0192011 | A1 * | 10/2003 | Williamson et al. | 715/525 |
| 2003/0229845 | A1 | 12/2003 | Salesin et al. | 715/500 |
| 2005/0094475 | A1 * | 5/2005 | Naoi | 365/232 |
| 2006/0129923 | A1 * | 6/2006 | Tsykora | 715/527 |
| 2006/0136818 | A1 * | 6/2006 | Burago et al. | 715/518 |
| 2006/0227153 | A1 * | 10/2006 | Anwar et al. | 345/660 |
| 2006/0265649 | A1 * | 11/2006 | Danilo | 715/542 |
| 2006/0294460 | A1 * | 12/2006 | Chao et al. | 715/520 |
| 2007/0038928 | A1 | 2/2007 | Marks et al. | |
| 2007/0186155 | A1 * | 8/2007 | Williamson et al. | 715/518 |
| 2008/0282149 | A1 * | 11/2008 | Williamson et al. | 715/251 |

OTHER PUBLICATIONS

Bouckaert, A Probabilistic Line Break Algorithm, Google 2003, pp. 309-401.*

Hosobe, Solving Linear and One-Way Constraints for Web Document Layout, ACM 2005, pp. 1252-1253.*

Roberts et al., The Evaluation of Text Editors: Methodology and Empirical Results, ACM 1983, pp. 265-283.*

(Continued)

*Primary Examiner*—Cong-Lac Huynh
(74) *Attorney, Agent, or Firm*—Merchant & Gould, P.C.

(57) ABSTRACT

Optimal formatting of a paragraph is delayed during the time a user is editing an optimal paragraph. When a user begins to edit a line within an optimal paragraph an attempt is made to preserve the current break point of the line during the editing. When the current break point of the current line may not be preserved, the formatting of the current line is changed to normal, i.e. non-optimal, and a new line break is calculated. If the new line break causes text on the current line to move to an adjacent line then that line break is attempted to be preserved. The formatting process continues until the end of the paragraph is reached or the current break point may be maintained. Delaying the optimal formatting of the paragraph results in less distraction to the user.

20 Claims, 5 Drawing Sheets

OTHER PUBLICATIONS

Samset, Heuristics for the Line Division Problem in Computer Justified Text, ACM 1892, pp. 564-571.*

Bouckaert, Remco R. "A Probabilistic Line Breaking Algorithm," Google 2003, pp. 390-401.

Brown, Parallel processing and Document Layout, Electronic Publishing: Origination, Dissemination and Design UK, vol. 1, No. 2, Sep. 1998 (pp. 97-104).

Bruggemann-Klein et al., On the Pagination of Complex Documents, Computer Science in Perspective. Essays Dedicated to Thomas Ottmann, Springer-Verlag Berlin Germany, 2003 (pp. 49-68).

Chinese First Office Action dated Feb. 13, 2009 cited in Application No. 200510126790.9.

European Communication dated Aug. 25, 2008 cited in Application No. 05111638.2—1527 / 1672521.

European Search Report dated May 29, 2008, EP App. No. 05111638.2-1527(12 pages).

Knuth et al., Breaking Paragraphs into Lines, Software Practice & Experience, Wiley & Sons, Bognor Regis, GB, vol. 11, Jan. 1, 1981 (pp. 1119-1184).

Office Action mailed Jul. 2, 2007, in U.S. Appl. No. 11/018,917.

Office Action (Final) mailed Jan. 25, 2008, in U.S. Appl. No. 11/018,917.

Office Action mailed Sep. 15, 2008, in U.S. Appl. No. 11/018,917.

Office Action mailed Mar. 5, 2009, in U.S. Appl. No. 11/018,917.

* cited by examiner

DELAYING OPTIMAL PARAGRAPH LAYOUT DURING EDITING

BACKGROUND

Optimal Paragraph Alignment is a method of laying out a paragraph of text iteratively, so as to provide the best visual appearance of the paragraph. An optimized paragraph layout algorithm developed by Professor Donald Knuth for the TeX program considers the various ways to break a paragraph into lines. In particular, the algorithm calculates a penalty function to evaluate the quality of each way of breaking the paragraph into lines. Based on the results, the algorithm chooses the best way to break the paragraph. The approach set forth by Knuth improves the typographic quality of text by improving the uniform distribution of white space in paragraphs for justified paragraphs and the appearance of ragged-right paragraphs. In order to accomplish these benefits in linear time, Knuth's algorithm applies techniques of dynamic programming. Since the optimal paragraph layout is iterative, however, the text can have a tendency to visually move around or "wiggle" on the page during editing of the paragraph. The location of the current editing point may also move or even change lines as a result of the optimal paragraph layout. This movement can distract users and potentially lead to a negative user experience.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Optimal formatting of a paragraph is delayed during the time a user is editing an optimal paragraph. While the user edits an optimal paragraph an attempt is made to preserve the current break point of each of the lines during the editing process. Preserving the current break point helps to reduce the amount of formatting required to be made to the lines within the paragraph. When the current break point of the current line may not be preserved, the formatting of the current line is changed to normal, i.e. non-optimal, and a new line break is calculated. If the new line break causes text on the current line to move to an adjacent line then that line break is attempted to be preserved. The formatting process continues until the end of the paragraph is reached or the current break point may be maintained. The paragraph may then be optimally formatted when it does not cause a distraction to the user. Delaying the optimal formatting of the paragraph results in less distraction to the user since it is more unlikely that the text will move unexpectedly during the editing process.

DETAILED DESCRIPTION

Figure 1:
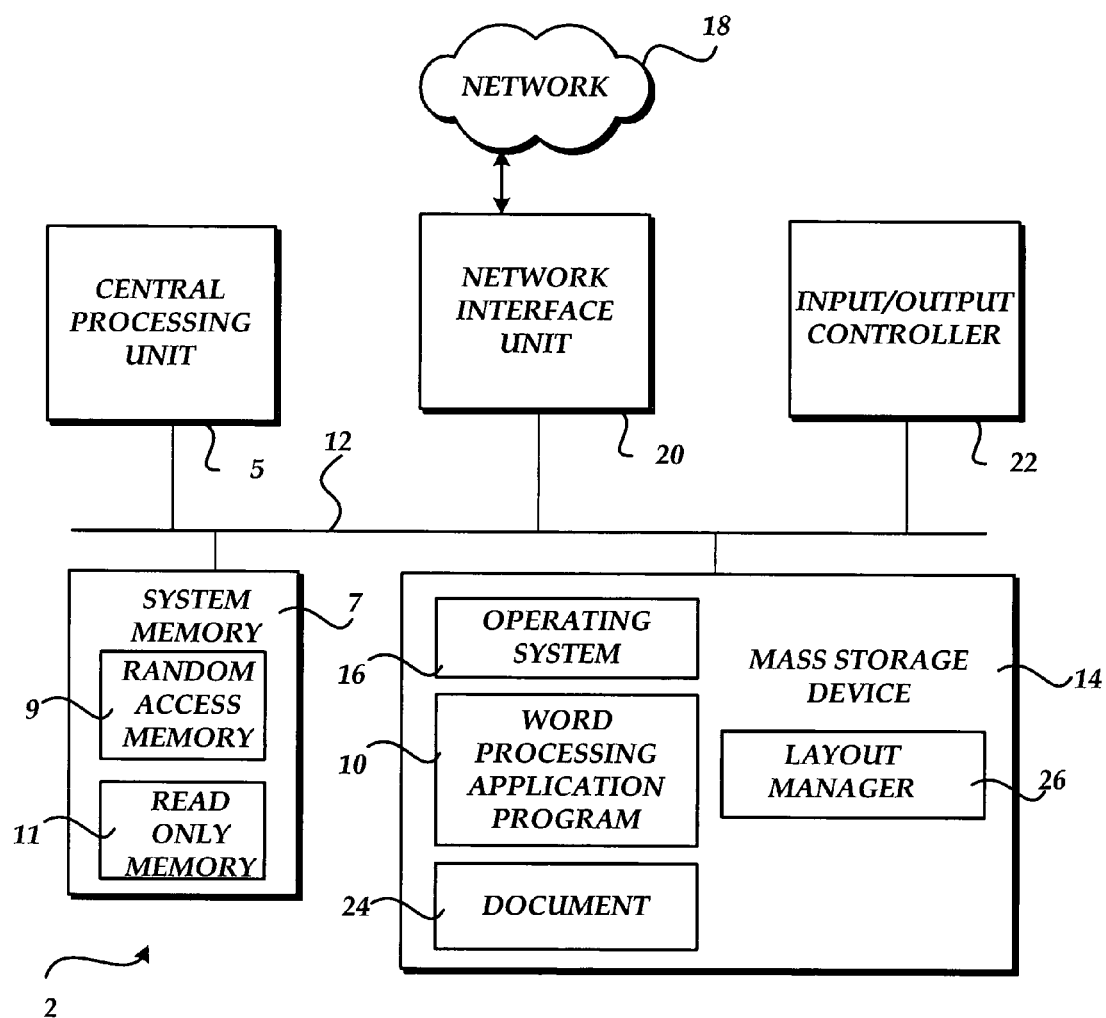
FIG. 1 illustrates an exemplary computing architecture for a computer.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 2 utilized in the various embodiments will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, the computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. The network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a word processing application program 10. The word processing application program 10 is operative to provide functionality for creating and editing electronic documents, such as the document 24. According to one embodiment of the invention, the word processing application program 10 comprises the MICROSOFT WORD word processing application program from MICROSOFT CORPORATION. Other word processing applications and document layout programs from other manufacturers may also be utilized. For instance, desktop publishing programs, presentation programs, web browsers, and any other type of program that utilizes text paragraphs in a document may be used.

In conjunction with the editing of a word processing document, the word processing application program 10 provides functionality for laying out paragraphs of text in a document 24. The word processing application program 10 may utilize a layout manager 26 to assist in the formatting of the document 24, including the lay out of text lines and paragraphs. As will be described in greater detail below, the layout manager 26 provides layout services for the word processing application program 10. In particular, the layout manager 26 performs an algorithm to lay out lines and paragraphs of text. Additional details regarding the operation of the layout manager 26 will be provided below.

Figure 2:
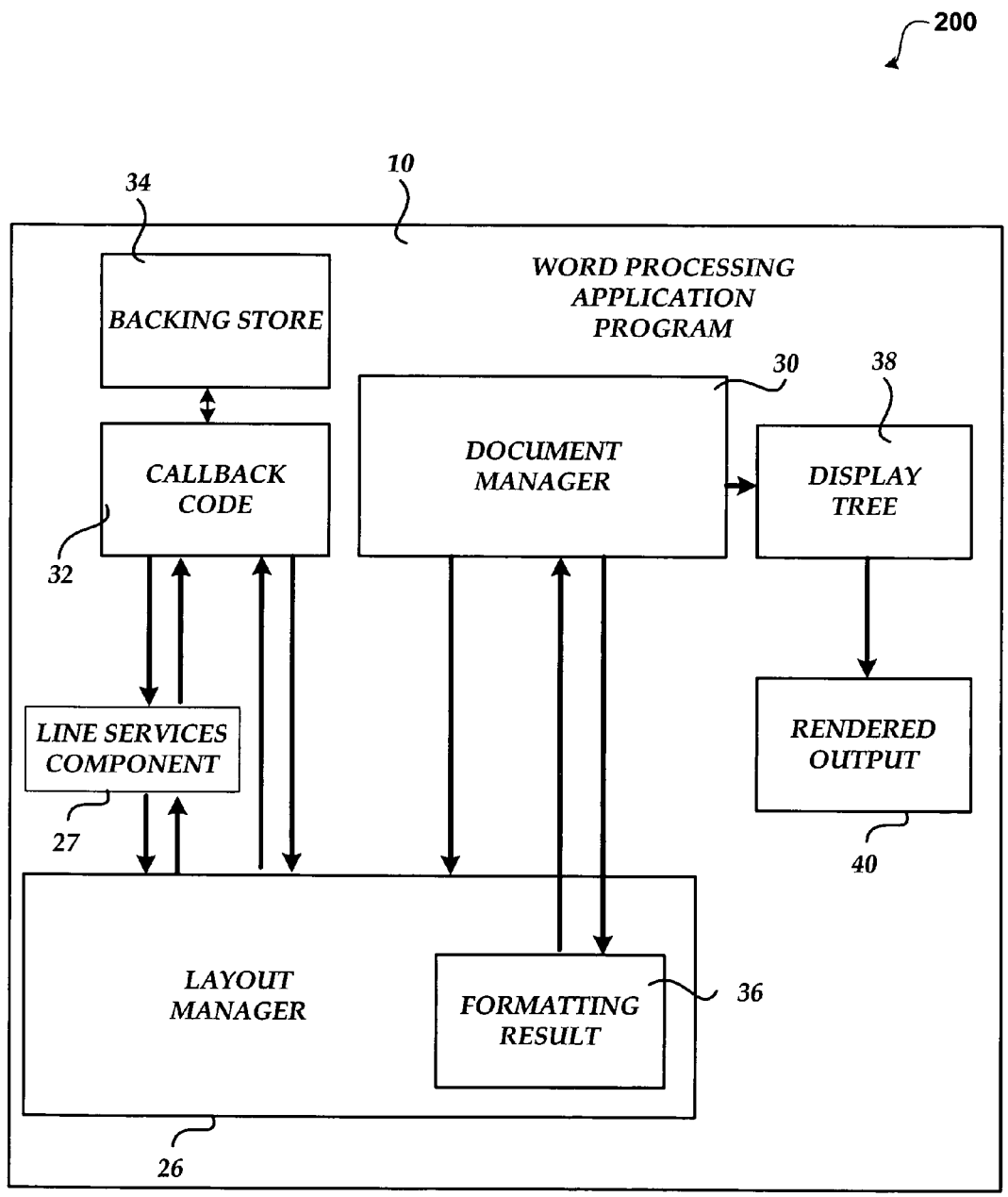
FIG. 2 illustrates a layout system.

FIG. 2 illustrates a layout system 200, in accordance with aspects of the invention. As described briefly above, the layout manager 26 provides document layout services for application 10. According to one embodiment, the document may be stored in a backing store 34. In order to facilitate communication with the layout manager 26, one or more callback routines, illustrated in FIG. 2 as callback code 32 may be implemented. Through the use of the callback code 32, the layout manager 26 may query for additional information necessary to lay out various portions of the document.

As will be described in greater detail below, the layout manager 26 provides facilities for laying out lines and paragraphs of text. The layout manager 26 provides these facilities in response to a request from the application program 10. The document manager 30 may communicate with the layout manager 26 to request that at least a portion of the paragraph be laid out. The document manager 30 may also provide to the layout manager 26 the text and other content from the document that should be laid into the paragraph. The document manager 30 may initially provide some of the content to the layout manager 26. The layout manager 26 may then request additional content from the callback code 32 as needed to lay out the text. The document manager 30 may also indicate to the layout manager 26 the style of the text to be laid out. For instance, the document manager 30 may indicate the typestyle, size, and other information necessary to lay out the text to the layout manager 26.

During the process of laying out text, the layout manager 26 may utilize the services of a line services component 27.

The line services component 27 is language-independent and is operative to provide services with respect to single lines of text. In particular, the line services component 27 can produce sets of possible breaking points for a span of text. Potential breaking points include (for Western languages) space characters, hyphen characters, and grammatically correct breaking points within words. The line services component 27 can also determine where between-character justification can be made for any language. According to embodiments of the invention, the line breaking information produced by the line services component 27 may be cached by the layout manager 26 to improve performance during the paragraph layout process. Layout manager 26 may request that the line services component 27 produce all possible line breaks for the line.

The break point information produced by the line services component 27 may be utilized by a penalty function executing within the layout manager 26 to determine which breaking points are better than others. Factors that may influence the calculation of the penalty are the amount of white space to distribute on a line as opposed to the number of good justification opportunities or the amount by which to compress as opposed to the number of compression opportunities. Other factors may include whether the line has a hyphen, whether an immediately previous or subsequent line is also hyphenated, and the difference in length between consecutive lines. Another factor that may be utilized is the "quality" of a particular hyphenation. For instance, the hyphenation of the word "automobile" as "auto-mobile" is a better choice than "automo-bile." A dictionary may be utilized to determine which hyphenation is better than another. Other factors may also be utilized by the penalty function.

According to embodiments of the invention, the penalty function utilized by the layout manager 26 may be computed differently depending upon the text being analyzed. In particular, an acceptable typography limit may first be defined. A first penalty may be calculated for lines that lie within the defined acceptable typography limit. In these cases, penalty functions utilized by previous line breaking algorithms provide a good solution. A second penalty may be utilized, however, for lines that lie outside the bounds of reasonable typography. These lines are considered to be very bad lines. The second penalty is calculated according to the white space the line introduces to the page. As a result, very bad lines have large penalties, but their penalties grow at a much slower rate than penalties for lines that are not considered very bad. The result is that lines that are otherwise acceptable will not be turned into very bad lines when trying to improve the quality of other bad lines. This allows the algorithm to produce a reasonable layout that does not overflow the right margin even in some bad typographical cases without a sufficient number of justification opportunities.

When a user begins to edit a paragraph that has been optimally laid out within document 24 using an application, such as word processing application program 10, or some other type of page layout application program, program 10 will communicate these changes with layout manager 26 and the optimal formatting of the paragraph being edited will be turned off during the time the paragraph is being edited.

The layout manager 26 attempts to preserve the current break point of the line currently being edited within the paragraph. Preserving the current break point helps to reduce the amount of formatting required to be made to the lines within the paragraph. When the current break point of the current line may not be preserved, the formatting of the current line is changed to normal, i.e. non-optimal, and a new line break is calculated by line services component 27. If the new line break causes text on the current line to move to an adjacent line then the line break on that line is attempted to be preserved. The formatting process continues until the end of the paragraph is reached or the current break point may be maintained.

Once the editing has been completed the paragraph may be optimally formatted by layout manager 26. Delaying the optimal formatting of the paragraph results in less distraction to the user since it is more unlikely that the text will move unexpectedly during the editing process.

Once the layout manager 26 has laid out the text in the manner described herein, a formatting result 36 is passed back to the document manager 30. In response to receiving the formatting result 36, the document manager 30 is operative to update the display tree 38 maintained by the application program 10. Based on the changes to the display tree 38, the application program 10 may update its rendered output 40 to display the formatting result to a user.

Figure 3:
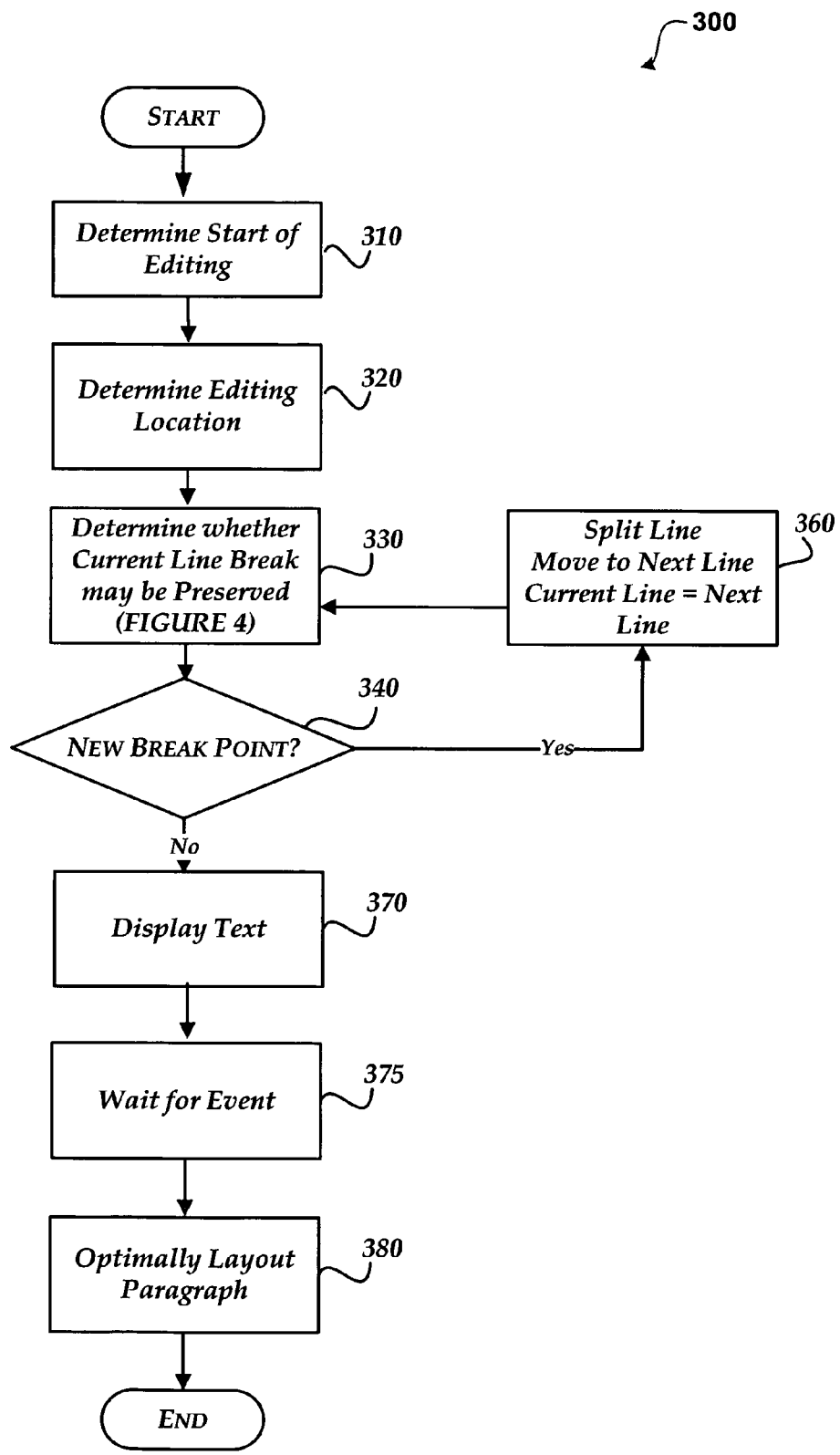
FIG. 3 shows a process for delaying optimal paragraph layout during editing.
Figure 4:
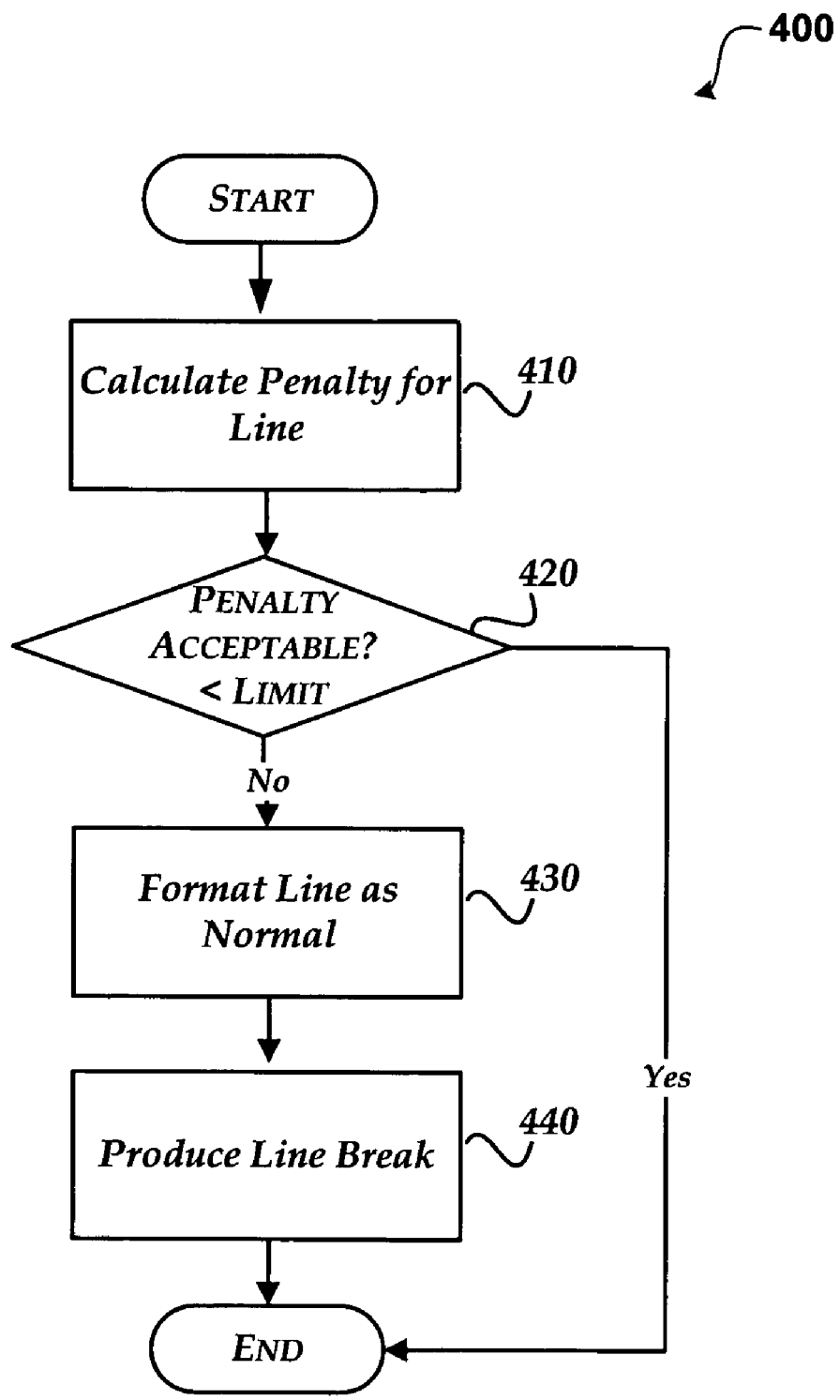
FIG. 4 illustrates a process for determining whether a current break point may be preserved.

Referring now to FIGS. 3 and 4, an illustrative process for delaying optimal paragraph layout during editing will be described. Although the embodiments described herein are presented in the context of a layout manager 26 and a word processing application program 10, other types of application programs that format lines of text optimally may be utilized. For instance, the embodiments described herein may be utilized within a presentation application program, a spreadsheet application program, or a drawing or computer-aided design application program, and the like.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments of the described herein are referred to variously as operations, structural devices, acts or modules. These operations, structural devices, acts and modules may be implemented in software, in firmware, in special purpose digital logic, and any combination thereof.

FIG. 3 shows a process for delaying optimal paragraph layout during editing, in accordance with aspects of the invention.

After a start block, the process moves to operation 310 where a determination is made as to when editing begins. The editing may include inserting and/or deleting characters from any line or lines of text that have been optimally formatted.

Flowing to operation 320, a current editing location is determined. According to one embodiment of the invention, the current editing location is the current line within the paragraph that is being edited. For example, the current editing location may be the first line within a paragraph, the second line, the third line, and the like. Formatting of the paragraph begins at the current line location and, generally, will not include formatting each of the lines within the paragraph.

At operation 330, a determination is made as to whether the current line break may be preserved. An attempt is made to format as few lines within the paragraph as possible during the editing process. Generally, if the edit does not cause text to flow from one line to another within the paragraph, then only the current line edited will be affected by the edit (See FIG. 4 and related discussion for more details). For example, the current line break can most likely be preserved when a user types a single letter in the middle of the optimal paragraph and there is space between the current break point and the end of the available space on the line.

At decision operation 340, a determination is made as to whether the editing caused a new break point to be produced. When the current line break could not be preserved, the process flows to operation 360. At operation 360, the line is split and the current line is set to the next line. Formatting continues as described above and continues until a current break point on the current line may be preserved or the end of the paragraph is reached.

When the editing does not cause the line-break to change, the process moves to operation 370 where the text is displayed. At this point, only the lines that have been edited or lines in which the current break point could not be maintained without losing text have been formatted and should be redisplayed. The remaining lines of the paragraph and on the page might be shifted up or down.

Moving to operation 375, the process may wait for an event to occur before transitioning to operation 380 where the paragraph may be optimally formatted. The event may be selected from many different events. One event includes when the user stops editing. After the editing stops the affected paragraph and/or the entire page may be reformatted in the background without distracting the end user. If the layout of the reformatted page is different from the current display, the necessary parts of the screen may be redrawn. The optimal layout may also be initiated by the user. For example, the user could select a button or menu instructing the optimal layout to occur. The optimal layout could also be applied when a new paragraph is edited.

FIG. 4 illustrates a process for determining whether a current break point may be preserved, in accordance with aspects of the invention.

After a start block, the process moves to operation 410 where a penalty is calculated for the current line. As discussed above, some of the factors that may influence the calculation of the penalty are the amount of white space to distribute on a line as opposed to the number of good justification opportunities or the amount by which to compress as opposed to the number of compression opportunities.

At decision operation 420, a determination is made as to whether the penalty is acceptable. The penalty is acceptable when it is less than a predetermined limit. Different penalty levels may be set depending upon the requirements of the application. For example, the penalty level may be set to a very stringent level which would cause more lines to be reformatted as compared to setting the penalty level to a less stringent level which may reduce the number of lines reformatted but may result in a slightly less desirable layout. Generally, the penalty is acceptable as long as the line will be visually appealing when the line is presented to a user. For example, a line having only one word on the line is generally not acceptable. Similarly, a line having thirty words crammed onto it is not generally acceptable. When the penalty is acceptable, the process moves to an end block.

When the penalty is not acceptable, and therefore preserving the current break is not possible, the process moves to operation 430 where the line is reformatted as normal. According to one embodiment, only the line currently being formatted is set to normal. Normal refers to the normal layout mode of the application as compared to the optimal layout mode. Under normal formatting, each line within a paragraph is formatted individually without considering the formatting of the adjacent lines. For instance, normal formatting for most word processing applications begins by formatting the first line from the first character of a paragraph, finding the best line break for the line, and then continuing with the next line until each of the lines within the paragraph is formatted.

Flowing to operation 440 a line break is produced for the line. Some of the factors that may be taken into account when locating the best break include whether a paragraph is ragged-right or justified, whether compression is permitted on the line, whether hyphenation is permitted, as well as other factors. The new line break may cause text to be pushed to the next line when an addition of text is made to the line or may cause text from a line below to be pulled up to the current line when text is deleted from the current line.

The process then moves to an end block and returns to processing other actions.

Figure 5:
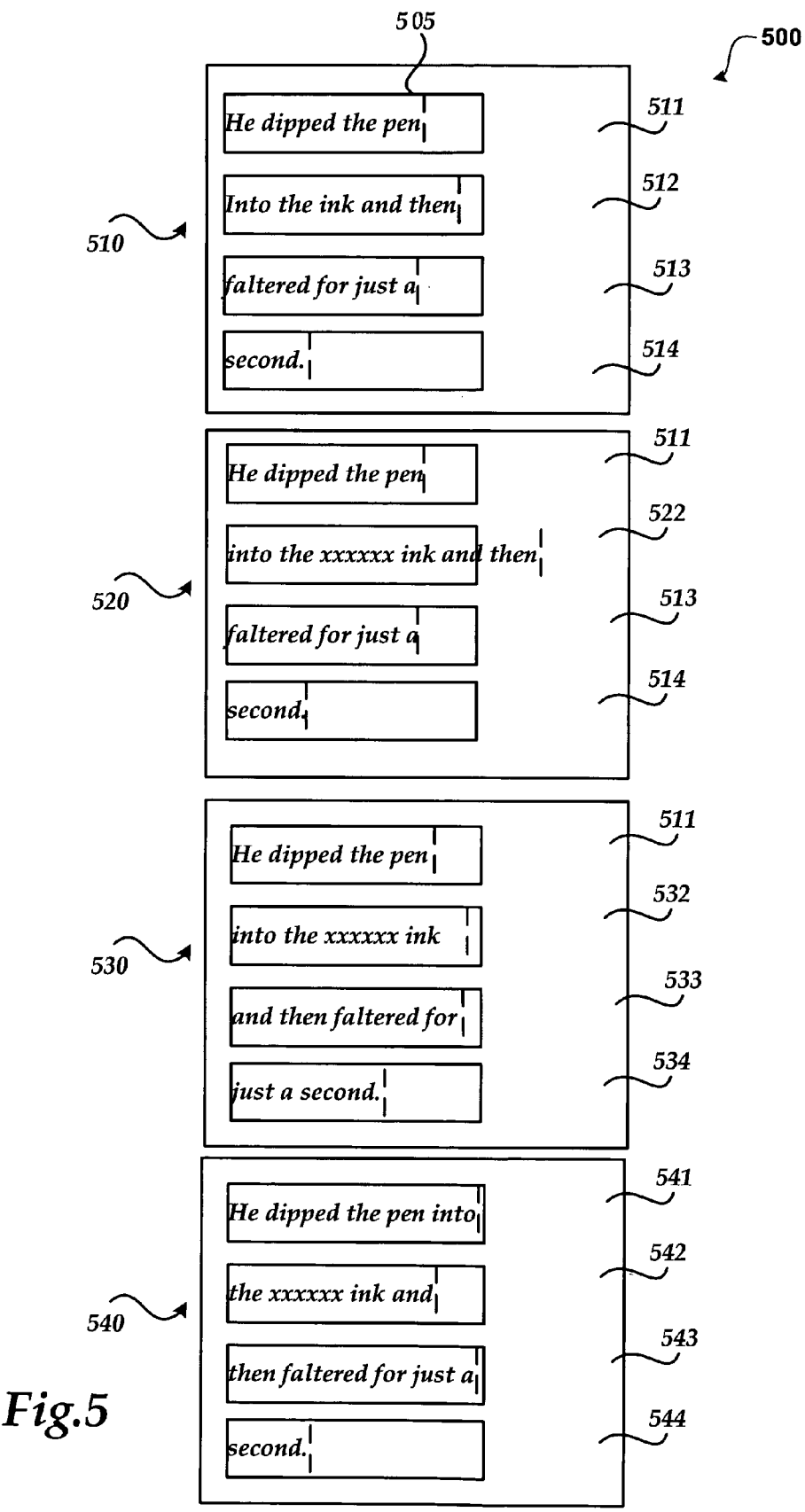
FIG. 5 shows an exemplary paragraph in various states, in accordance with aspects of the present invention.

FIG. 5 shows an exemplary paragraph in various states, in accordance with aspects of the invention. As shown in FIG. 5, the paragraph comprises four lines. Any length of text having any number of lines may be formatted in the manner described herein. A break point 505 for each line is also illustrated. As can be seen, the break point may be different for each line. For purposes of this example, assume that paragraph 510 has been optimally laid out, and, therefore, the break points are also optimal.

Paragraph 520 shows an interim state where an edit that has been made to the second line (522) of the text. Comparing line 522 to line 512 it can be seen that "xxxxxx" has been inserted between "the" and "ink." In this example, the addition of "xxxxxx" made the current break point unacceptable as it would be beyond the text margin.

Paragraph 530 shows the state of the paragraph before an event that has allowed the paragraph to be re-layed out optimally. Line 532 has been reformatted as normal, which caused the text, "and then" to move to line 533. Line 533 also had to be reformatted as normal, which caused more text ("just a") to move to the next line (534).

Paragraph 540 shows the state of the paragraph after an event that has allowed the paragraph to be re-layed out optimally. As can be seen, each of the lines (541, 542, 543 and 544) changed as a result of the optimal layout.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for laying out text, comprising:
    determining when an edit is made to a line of text within a paragraph; wherein the paragraph comprises lines of text and wherein the paragraph has been optimally laid out;
    delaying optimal formatting of the paragraph during editing;
    determining whether a current break point of the line may be maintained by examining the edited line while not examining the other lines of text within the paragraph; and
    upon determining that the current break point may not be maintained: formatting the edited line with a new acceptable break point; formatting lines subsequent to the edited line with new break points according to formatting of the edited line until the end of the paragraph; and
    optimally formatting all lines of the paragraph.

2. The method of claim 1, wherein determining whether the current break point of the line may be maintained comprises calculating a penalty for the line.

3. The method of claim 2, further comprising determining whether the penalty for the line is acceptable.

4. The method of claim 3, wherein determining whether the penalty for the line is acceptable comprises determining whether the penalty exceeds a predefined limit.

5. The method of claim 1, when the current break point may not be maintained further comprising producing a new break point for the line and determining whether the new break point causes text on the line to move to an adjacent line.

6. The method of claim 5, further comprising moving to an adjacent line within the paragraph when the new breakpoint causes the text on the line to move to the adjacent line and determining whether the break point on the adjacent line may be maintained.

7. The method of claim 1, further comprising optimally laying out the paragraph on the occurrence of at least one of the following events: a user selection specifies to optimally format the paragraph and in response to a new paragraph being edited.

8. A computer-readable storage medium having computer-executable instructions executed by a processor for laying out text in an optimally formatted paragraph, comprising:
    determining when an edit is made to the optimally formatted paragraph;
    delaying optimally formatting the paragraph during editing;
    determining the location of the edit; wherein the location identifies a line within the optimally formatted paragraph;
    non-optimally formatting the line edited and lines subsequent to the edited line by:
    preserving the current break point when possible; otherwise when the current break point may not be preserved producing a new break point for the line; and
    optimally formatting the paragraph after the non-optimally formatting of the paragraph is completed.

9. The computer-readable medium of claim 8, further comprising calculating a penalty for the line.

10. The computer-readable medium of claim 9, further comprising determining whether the penalty for the line is acceptable by comparing the penalty to a predefined value.

11. The computer-readable medium of claim 8, when preserving the current break point comprises determining whether the edit causes the current break point to move.

12. The computer-readable medium of claim 11, further comprising setting the current line to an adjacent line when the new break point for the line causes text on the line to move to the adjacent line.

13. The computer-readable medium of claim 8, further comprising optimally laying out the paragraph on the occurrence of at least one of the following events: a user selection of optimally formatting the paragraph and in response a new paragraph being edited.

14. A system for delaying the optimal layout of a paragraph, comprising:
    a processor and a computer-readable medium;
    an application operating on the processor that is configured to edit a paragraph that has been optimally laid out and that is configured to determine when an edit is made to a line within an optimally formatted paragraph and determine the location of the edit;
    a layout manager coupled to the application and that is configured to turn off optimal formatting during editing and format the line being edited and lines subsequent to the line being edited by attempting to preserve a current break point of the line when possible; otherwise when the current break point may not be preserved: produce a new break point for the line; and turn on optimal formatting of the paragraph after formatting of the paragraph is complete.

15. The system of claim 14, further comprising a line services component coupled to the layout manager and that is configured to calculate a penalty for the line.

16. The system of claim 15, wherein the layout manager is further configured to determine whether the penalty for the line is acceptable by comparing the penalty to a predefined value.

17. The system of claim 14, wherein preserving the current break point comprises determining whether the edit causes the current break point to move.

18. The system of claim 17, wherein the layout manager is further configured to set the current line to an adjacent line when the new break point for the line causes text on the line to move to the adjacent line.

19. The system of claim 14, wherein the application is further configured to optimally lay out the paragraph on the occurrence of at least one of the following events: a user selection specifies to optimally format the paragraph and in response to a new paragraph being edited.

20. The system of claim 14, wherein the application is a word processing application.

\* \* \* \* \*